Jan. 18, 1955   L. B. NEIGHBOUR   2,699,949
MANURE SPREADER ENDGATE CONTROL
Filed Sept. 13, 1951   2 Sheets-Sheet 1
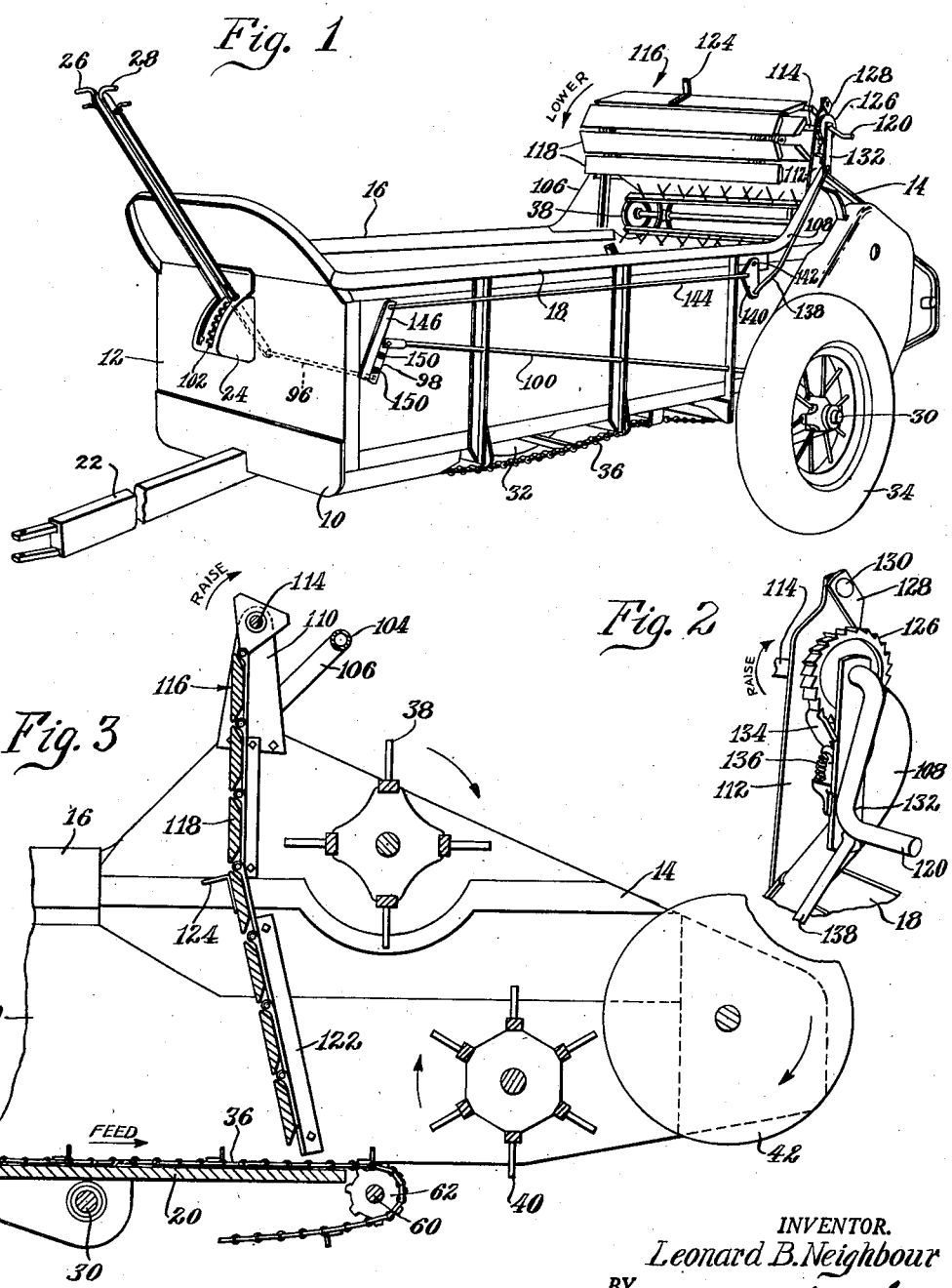
INVENTOR.
Leonard B. Neighbour
BY
Attorneys Jan. 18, 1955
L. B. NEIGHBOUR
2,699,949
MANURE SPREADER ENDGATE CONTROL
Filed Sept. 13, 1951
2 Sheets-Sheet 2
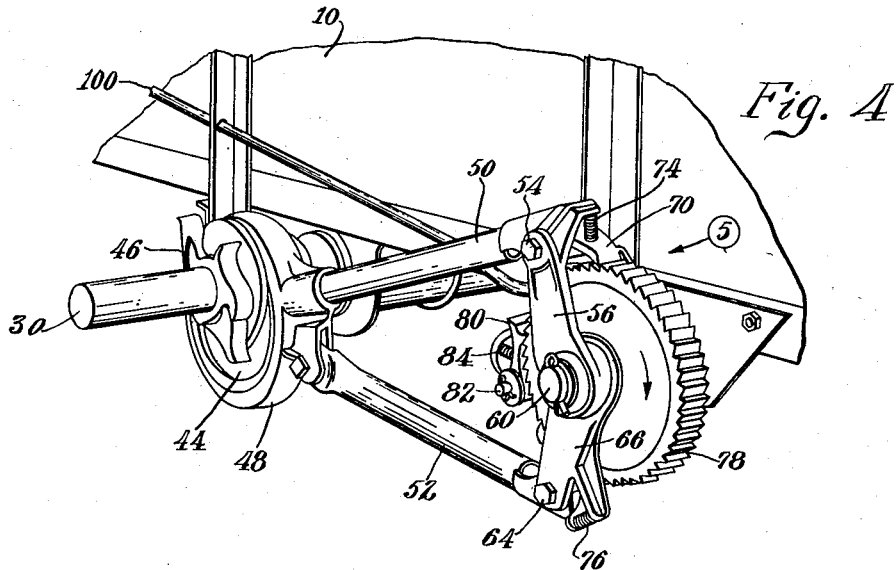
Fig. 4
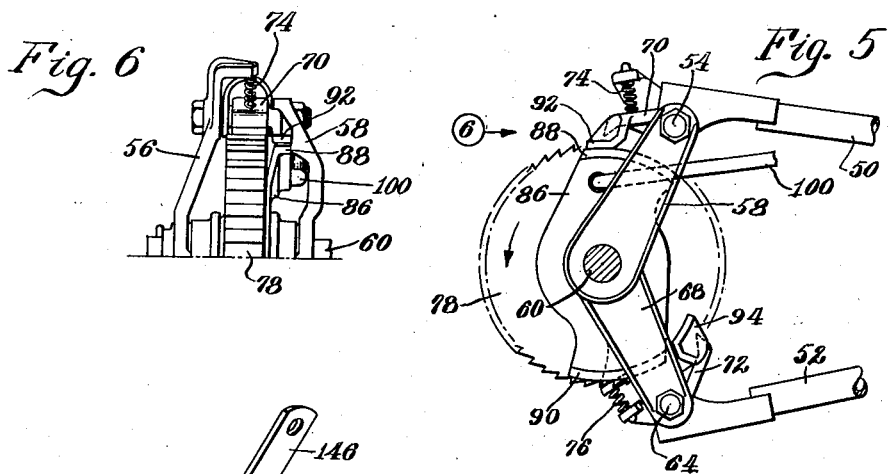
Fig. 6
Fig. 5
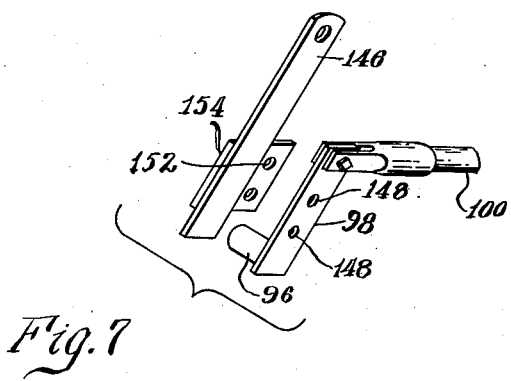
Fig. 7
INVENTOR.
Leonard B. Neighbour
BY
Attorneys United States Patent Office
2,699,949
Patented Jan. 18, 1955

2,699,949

MANURE SPREADER ENDGATE CONTROL

Leonard B. Neighbour, Moline, Ill., assignor to Deere & Company, Moline, Ill., a corporation of Illinois Application September 13, 1951, Serial No. 246,418

3 Claims. (Cl. 275—5)

This invention relates to a material unloader and more particularly to mechanism for controlling the discharge opening in a material unloader of the manure spreader type. Still more specifically, the invention relates to an improved control for an endgate by means of which the endgate can be operated by control means normally utilized for other purposes on the spreader.

The conventional manure spreader comprises a longitudinal body having a closed front end and an open rear end. Variable-rate feed means is provided for advancing the load to the rear for discharge through the open rear end to beating and distributing mechanism. The various drivable components of the spreader are normally driven from the ground wheels; although, they may be power driven from a power take-off shaft, for example, of a tractor to which the spreader is connected.

In many cases, manure spreaders are provided with what is known as an endgate attachment. Such attachment conventionally comprises a plurality of slats flexibly connected together and capable of being rolled up about a shaft carried at the rear end of the tractor and functioning when unrolled to provide a closure at the rear end of the spreader to prevent the load from dropping out of the rear end of the spreader during loading and during transport of the spreader from the barnyard to the field. Conventional design has heretofore provided manual means for rolling or unrolling the endgate attachment, and the operating means is located at the rear end of the spreader. Therefore, the operator, before beginning to load the spreader, manually unrolls or lowers the endgate and then proceeds to load the spreader. Whether the spreader is tractor-drawn or horse-drawn, the operator is seated at a position remote from the endgate attachment. Accordingly, when he reaches the field and desires to begin operation of the spreader, he must dismount from his position and walk to the rear of the spreader for the purpose of raising the endgate.

According to the present invention, a remote control is provided whereby the operator may control raising of the endgate or closure means without dismounting from his position at the front of the spreader. It is a further object of the invention to utilize as part of the remote control means one of the control levers conventionally provided for adjustment of other parts of the spreader. In a typical spreader construction, such other mechanism may comprise the means for effecting variations in rate of feed of the feed means. For example, it is not unconventional to provide in a spreader pawl and ratchet means of variable strokes for causing operation of the feeding means in increments of different sizes effective to advance the load in larger or smaller quantities to the beating and distributing mechanism. In one such variable-rate speed means, there is provided adjustable means movable back and forth to selectively position the pawls of the pawl and ratchet mechanism to vary the effectiveness thereof through their angular ranges of movement; that is to say, the adjustment is such as to vary the extent to which the pawls are in engagement with the ratchet wheel, thereby varying the angular increments through which the ratchet wheel will move at any given speed.

On the basis of the adjustability of such feed mechanism, it is an object of the invention to utilize the reciprocating control lever for the feed mechanism for imparting reciprocating movement to actuating means for raising the endgate attachment or closure means. In this respect, it is a further object to provide the improved means as an attachment for conventional spreaders, which attachment can be effected without materially altering the basic design of the spreader.

The foregoing and further important objects and desirable features inherent in and encompassed by the invention will become apparent as the disclosure progresses on the basis of the following detailed description and accompanying sheets of drawings in which Figure 1 is a perspective view of a typical manure spreader;

Figure 2 is an enlarged fragmentary perspective view of the actuating means for the endgate attachment;

Figure 3 is an enlarged fragmentary, longitudinal sectional view showing a rear portion of the spreader with emphasis upon the endgate attachment and its relationship to the feeding, beating and distributing means;

Figure 4 is a perspective view on an enlarged scale showing the drive and feed means for advancing the load to the rear of the body;

Figure 5 is a fragmentary sectional view as seen from the inside of the feed means when looking in the direction of the arrow bearing the encircled numeral 5 in Figure 4;

Figure 6 is a partial end elevational view of the structure shown in Figure 5 as seen when looking in the direction of the arrow bearing the encircled numeral 6 in Figure 5; and Figure 7 is a perspective exploded view showing a preferred form of connection between the operating attachment and the existing control lever.

In the following description and in the claims, reference will be had to certain parts as being disposed at the front or rear end of the spreader body. These terms are used for convenience only and are not intended to support the importation of any limitations into the claims.

The typical spreader shown in Figure 1 comprises a longitudinal body 10 having a front end 12, an open rear end 14 and right- and left-hand sides 16 and 18. The body further includes a floor 20 which terminates at its rear end short of the open rear end 14 of the side walls 16 and 18.

The spreader illustrated has a forwardly extending draft tongue 22 by means of which the spreader may be connected to a tractor or other vehicle to be drawn over a field. The front wall 12 carries thereon a support 24 which forms means for carrying a pair of control levers 26 and 28. These levers are for the purpose of controlling various drivable components of the spreader, the details of part of which will appear below.

The spreader is carried on a transverse axle 30 on which are journaled right- and left-hand ground wheels 32 and 34. In the instance shown, these wheels provide the power input for the drivable components of the spreader.

Material loaded in and carried by the body 10 is advanced toward the open rear end 14 of the body by feed means including an endless apron 36 movable in the direction of the arrow indicated in Figure 3. As will be explained below, the load is advanced in increments to upper and lower beaters 38 and 40 which function to disintegrate the load fed thereto and to transfer it to a wide-spread distributing beater 42, all of which is generally conventional.

The feed means further includes drive means connectible to the power input means as represented by the axle 30. This means is best shown in Figure 4 as comprising an eccentric 44 keyed to the axle 30. The ground wheels 32 and 34 are journaled on the axle but are effective to transmit rotary motion to the axle upon forward movement of the spreader. This result is accomplished by a pair of overrunning or one-way clutches, one of which appears at 46 in Figure 4. These clutches may be of any conventional design and the details thereof are not important here. The purpose thereof, as will be understood, is to provide for driving of the axle 30 during only forward travel of the spreader and also for permitting operation on turns.

The eccentric 44 is encircled by a collar 48 to which is connected a pair of push rods including an upper rod 50 and a lower rod 52. The upper rod is pivoted at its rear end at 54 to the upper ends of inner and outer swinging arms 56 and 58 journaled on a cross shaft 60. As will be seen in Figure 3, this shaft has keyed thereto a pair of sprockets (only one of which is visible at 62) for carrying the endless apron 36.

The lower push rod 52 is pivotally connected at 64 at its rear end to the lower ends of inner and outer swinging arms 66 and 68. The pivot at 54 serves for the mounting of an upper pawl 70 and the lower pivot at 64 serves for the mounting of a similar lower pawl 72. These pawls are spring-pressed respectively by springs 74 and 76 normally into engagement with the teeth of a ratchet wheel 78 keyed to the cross shaft 60. From the description thus far, it will be seen that the oscillating eccentric 44 causes reciprocation of the push rods 50 and 52 which in turn causes rotation of the ratchet wheel 78 via the pawls 70 and 72. A holding pawl 80 is pivotally carried at 82 on any suitable fixed part of the body and is spring-loaded by a spring 84 into engagement with the ratchet wheel 78 to prevent retrograde rotation of the ratchet wheel. The direction of rotation of the ratchet wheel for the purpose of advancing the apron 36 is indicated by an arrow in each of Figures 4 and 5.

In order that the rate of speed of the apron 36 may be varied, it is expedient to vary the effective strokes of the pawls 70 and 72. In the mechanism selected for the instant illustration, there is provided an adjusting or in-and-out-of-gear feed control member 86 rockable on the shaft 60 through a predetermined range and having upper and lower arcuate flanges 88 and 90 which respectively engage at times with overhanging portions 92 and 94 respectively integral with the pawls 70 and 72. The member or part 86 is shiftable selectively back and forth about its pivot on the cross shaft 60, between opposite extreme positions, to vary the extent to which the flange portions 88 and 90 will respectively support the pawls 70 and 72. For example, in the intermediate position of the member 86 shown in Figure 5, the upper pawl 70 is supported near the rear end of the flange 88, so that when the push rod 50 moves the pawl 70 rearwardly, a part of the motion will be idle as far as concerns rotation of the ratchet wheel, since the pawl 70 is prevented from immediately engaging the teeth of the ratchet wheel. As the member 86 is progressively adjusted in a counterclockwise direction, as viewed in Figure 5, the flange 88 presents a progressively longer obstacle to the pawl 70 and thus the pawl 70 is retained out of engagement with the ratchet wheel 78 for a progressively longer period until in an extreme counterclockwise position of the member 86 the flange 88 keeps the pawl entirely out of engagement with the ratchet wheel, or establishes a no-feed or out-of-gear position of the member. Conversely, as the member 86 is shifted in a clockwise direction, as viewed in Figure 5, the obstacle is progressively removed and the effectiveness of the pawl 70 is progressively increased to a maximum feed rate. The same applies to the relationship between the lower flange 90 and the lower pawl 72. Thus, the member 86 is effective to vary the time or extent to which the pawls 70 and 72 will be in engagement with or disengagement from the ratchet wheel 78 and accordingly the rate of feed of the apron 36 will be varied.

The foregoing description of the variable-rate feed mechanism will apply generally to conventional mechanisms of that type and, even through such mechanism is generally old, resort has been had to a rather detailed description for the purposes of facilitating an understanding of the applicability of the invention to the endgate attachment to be presently described.

As previously stated, the front wall 12 carries the support 24 for the control levers 26 and 28. Since the components for which the lever 26 constitutes a control are not important here, the description will proceed without further reference to this lever.

The lower end of the lever 28 extends inwardly of the front wall 12 and is fixed to a transverse rockshaft 96. This rockshaft extends laterally outwardly of the left-hand side wall 18 and has fixed thereto an arm 98. Operating means in the form of a longitudinally extending link 100 is connected at its front end to the top of the arm 98 and is connected at its rear end to the adjusting part 86. Thus, rocking of the lever 28 through a range comparable to that of the part 86 is transmitted via the rockshaft 96, arm 98 and link 100 to the part 86 and constitutes a remote control for the feed mechanism. The support 24, insofar as concerns the lever 28, is provided with a plurality of notches 102, any one of which may be selectively used to fix a selected position of the lever 28 and accordingly to fix a selected adjustment of feeding rate of the feeding mechanism. The construction in this respect is largely conventional.

Adjacent to the rear end of the body 10, the spreader is provided with a transverse arched support 104 having right- and left-hand downwardly and forwardly extending portions 106 and 108 respectively. These portions respectively carry upstanding brackets 110 (Figure 3) and 112 (Figure 1). These brackets are provided with appropriate bearings for journaling a transverse shaft 114 on which is carried closure means designated generally by the numeral 116. This closure means preferably comprises a plurality of transverse slats 118 articulately interconnected so that they may be rolled up or wrapped about the shaft 114. The shaft extends at its left-hand end and is shaped as a hand crank 120 so that the shaft may be locally rotated to cause the closure means 116 to roll or unroll. Each of the side walls 16 and 18 is provided with a generally upright strip in the form of an angle 122, so that when the closure means 116 is unrolled and moved to its obstructing or closing position as shown in Figure 3, it will engage the angles 122 and form a closure preventing discharge of the load at the rear end of the body. In other words, the closure means when in its closed position separates the load from the beaters 38 and 40. Pressure of the load against the closure means is, of course, resisted by the angles 122.

According to conventional design in the prior art, the endgate attachment is operated exclusively by the crank 120 and therefore the user of the machine must stand at the rear of the machine in order to change the position of the closure means.

One of the transverse slats 118 carries thereon an angle 124 that provides a stop engageable with the transverse portion of the arch 104. This stop prevents the closure means from being rolled too far in a raising direction, in which case it would immediately fall down into closing position but at the rear of the angles 122.

The directions of movement of the endgate attachment or closure means for raising or lowering are indicated by appropriate arrows and legends in Figures 1, 2, and 3.

There is keyed to the left end of the transverse endgate shaft 114 a driven element or ratchet wheel 126 with which cooperates a holding pawl 128 pivoted at 130 to the left-hand bracket 112. To the extent described, the endgate attachment may be rolled and unrolled by use of the crank 120, in either case requiring movement through a range several times that of the part 86. The holding pawl 128 maintains the raised position of the closure 116. The pawl 128 may be pivoted upwardly to release itself from the ratchet wheel so that the closure means may descend. Mechanism of this nature is satisfactory for effecting the operation of the closure means by an operator standing at the rear left side of the spreader.

However, it is expedient to provide a remote control for the endgate attachment so that it may be operated by an operator at the front end of the spreader. According to the present invention, there is loosely mounted on the shaft 114 a driving element in the form of a swinging arm 132 which carries a pivoted pawl 134 biased by a spring 136 into engagement with the ratchet wheel 126. The lower end of the swinging arm 132 is connected to the rear end of a link 138 and the lower end of the link is connected to a bell crank 140 pivoted at 142 on the left-hand side 18 of the spreader body 10.

The bell crank 140 is pivotally connected to the rear end of a forwardly extending operating link 144 which has its forward end pivotally connected to the upper end of an attachment arm 146. The attachment arm is connected to and operated by the rockshaft 96, preferably by the construction shown in Figure 7.

As previously stated, the rockshaft 96 is conventionally provided as part of the control means including the lever 28 and arm 98 for controlling the feed mechanism through the linkage 100. According to the present invention, the arm 98 is provided with a pair of spaced apertures 148 which may receive bolts 150 (Figure 1) that pass through a pair of spaced apertures 152 in a plate 154 rigidly secured, as by welding, to the attachment arm 146. By this means, the existing control mechanism 28—96—98 is utilized for the transmission of motion to the actuating means 126—132 for the endgate attachment, thus simply and inexpensively providing a remote control for the endgate attachment.

In the use and operation of the spreader, the closure means 116 is lowered to its closed position as shown in Figure 3. This may be accomplished by releasing both the pawls 128 and 134. Since both of these pawls are pivotally mounted, such release is easily accomplished so that the closure means may be lowered. While the spreader is standing, it is loaded and the closure means prevents the load from escaping at the rear end of the body 10. The spreader is then driven to the field and the operator, by merely releasing the lever 28 from its notches 102 in the support 24, may rock the lever 28 back and forth a sufficient number of times to actuate the means 126—132 to effect movement of the closure means 116 to its open or raised position as shown in Figure 1. If this operation is accomplished while the spreader is standing, there is absolutely no effect on the mechanism shown in Figures 4 and 5. Even if the operation is achieved while the spreader is moving, the time interval between the beginning and end of the raising operation for the endgate is so short as to have virtually no effect on the spreading operation insofar as concerns variation in adjustment of the feeding mechanism.

It will be seen from the foregoing description that a simple and inexpensive attachment has been provided for a conventional manure spreader, largely by utilizing conventional construction and supplementing that construction with remote control means for the endgate attachment. Various other features and objects of the invention not specifically enumerated herein will undoubtedly occur to those versed in the art, as likewise will many modifications and alterations in the preferred embodiment of the invention illustrated, all of which may be achieved without departing from the spirit and scope of the invention as defined in the appended claims.

What is claimed is:

1. In a material-distributing vehicle, the combination including: a material-containing body having front and rear ends, said rear end being open for the discharge of material therethrough; feed means on the body for moving material out of the discharge opening; power-transmitting means on the body; drive means selectively engageable and disengageable between the power means and the feed means and including an in-and-out-of-gear feed control member at the rear end of the body movable back and forth in alternate strokes through a predetermined range to engage and disengage the drive means; a manually operative control lever at the front of the body and movable back and forth in alternate strokes through a range comparable to that of the in-and-out-of-gear feed control member and connected to said member for moving said member back and forth; closure means at the rear end of the body and movable through a range several times greater than that of each stroke of the in-and-out-of-gear feed control member from an open position to a closed position as respects the rear end of the body; a driven element connected to the closure means; a driving element movable back and forth in alternate strokes through a range comparable to that of the control lever and arranged to impart incremental uni-directional movement to the driven member; and force-transmitting means running from front to rear of the body and connected at its front portion to the control lever and at its rear portion to the driving element for transmitting several strokes of the control lever to the driving element and consequently to drive the driven element for moving the closure means from one position to the other.

2. The invention defined in claim 1, in which: the closure means is of the roll-up type; the driven element is a rotatable ratchet connected to roll up the closure means; and the driving element has a pawl engaging the ratchet to impart said incremental unidirectional movement thereto.

3. The invention defined in claim 1, in which the force-transmitting means comprises: a bell crank rockable on the body adjacent to the closure means; a link connected between the bell crank and the driving element; and a second link connected between the bell crank and the control lever.

References Cited in the file of this patent

UNITED STATES PATENTS

| Number | Name | Date |
|---|---|---|
| 304,830 | Koble | Sept. 9, 1884 |
| 853,256 | Monson | May 14, 1907 |
| 944,293 | Stebbins | Dec. 28, 1909 |
| 1,036,916 | Seaman | Aug. 27, 1912 |
| 1,765,993 | Neighbour | June 24, 1930 |
| 1,843,431 | Neighbour | Feb. 2, 1932 |
| 1,946,807 | Neighbour | Feb. 13, 1934 |
| 2,051,885 | Neighbour | Aug. 25, 1936 |
| 2,486,214 | Seaholm | Oct. 25, 1949 |